US011871186B2

(12) United States Patent
Tiefenau

(10) Patent No.: US 11,871,186 B2
(45) Date of Patent: *Jan. 9, 2024

(54) EARMOLD WITH CLOSING ELEMENT FOR VENT

(71) Applicant: GN Hearing A/S, Ballerup (DK)

(72) Inventor: Andreas Tiefenau, Gammel Holte (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,861

(22) Filed: Jan. 3, 2022

(65) Prior Publication Data

US 2022/0132258 A1 Apr. 28, 2022

Related U.S. Application Data

(63) Continuation of application No. 16/690,090, filed on Nov. 20, 2019, now Pat. No. 11,245,995.

(30) Foreign Application Priority Data

Dec. 14, 2018 (EP) .................................... 18212555

(51) Int. Cl.
*H04R 25/00* (2006.01)

(52) U.S. Cl.
CPC ......... *H04R 25/652* (2013.01); *H04R 25/456* (2013.01); *H04R 2460/11* (2013.01)

(58) Field of Classification Search
CPC ...... H04R 25/60; H04R 25/65; H04R 25/456; H04R 25/652; H04R 2225/023; H04R 2225/025; H04R 2460/11
See application file for complete search history.

(56) References Cited

U.S. PATENT DOCUMENTS

| | | | |
|---|---|---|---|
| 4,069,400 A | 1/1978 | Johanson et al. | |
| 5,033,090 A * | 7/1991 | Weinrich ............. | H04R 25/453 381/318 |

(Continued)

FOREIGN PATENT DOCUMENTS

| | | |
|---|---|---|
| CN | 104768115 | 7/2015 |
| EP | 0 684 750 A2 | 11/1995 |

(Continued)

OTHER PUBLICATIONS

Final Office Action for U.S. Appl. No. 16/690,090 dated Jun. 17, 2021.

(Continued)

*Primary Examiner* — Suhan Ni
(74) *Attorney, Agent, or Firm* — Vista IP Law Group, LLP

(57) ABSTRACT

An earmold having an earmold shell, the earmold shell having a first end facing a tympanic membrane when the earmold is worn by a user, and a second end facing toward a surrounding of the user when the earmold is worn by the user, includes: a receiver configured to provide an audio output signal; a receiver channel coupled to an output of the receiver and extending to a receiver opening in the first end; and a vent channel coupled to the receiver channel through a first vent port, the vent channel having a vent opening in the second end; wherein the receiver channel comprises a closing element, the closing element comprising a first magnetic member, wherein the closing element is configured to cause the first vent port to be open when in a first state, and to cause the first vent port to be closed when in a second state.

21 Claims, 3 Drawing Sheets

(56) References Cited

U.S. PATENT DOCUMENTS

| | | | | |
|---|---|---|---|---|
| 5,195,139 | A * | 3/1993 | Gauthier .............. | H04R 25/652 381/328 |
| 6,021,207 | A | 2/2000 | Puthuff et al. | |
| 6,549,635 | B1 | 4/2003 | Gebert | |
| 6,819,770 | B2 | 1/2004 | Niederdränk | |
| 7,983,434 | B2 | 7/2011 | Röhrlein | |
| 8,923,543 | B2 | 12/2014 | Sacha et al. | |
| 9,706,290 | B2 | 7/2017 | Grinker | |
| 2001/0043708 | A1* | 11/2001 | Brimhall .............. | H04R 25/656 381/328 |
| 2002/0136420 | A1* | 9/2002 | Topholm .............. | H04R 25/658 381/325 |
| 2007/0206826 | A1 | 9/2007 | Röhrlein | |
| 2014/0169603 | A1 | 6/2014 | Sacha et al. | |
| 2016/0255433 | A1 | 9/2016 | Grinker | |

FOREIGN PATENT DOCUMENTS

| | | | |
|---|---|---|---|
| EP | 0 684 750 | A3 | 11/1995 |
| EP | 2 835 987 | A1 | 2/2015 |
| EP | 3 471 432 | A1 | 4/2019 |

OTHER PUBLICATIONS

Non-Final Office Action for U.S. Appl. No. 16/690,090 dated Aug. 18, 2021.

Non-Final Office Action for U.S. Appl. No. 16/690,090 dated Nov. 13, 2020.

Amendment Response to NFOA for U.S. Appl. No. 16/690,090 dated Sep. 24, 2021.

Amendment Response to NFOA for U.S. Appl. No. 16/690,090 dated Mar. 15, 2021.

Notice of Allowance for U.S. Appl. No. 16/690,090 dated Oct. 29, 2021.

Notice of Allowance for U.S. Appl. No. 16/690,085 dated Jun. 10, 2020.

Extended European Search Report dated Jun. 25, 2019 for corresponding European Application No. 18212555.9.

Extended European Search Report dated Jun. 25, 2019 for related European Application No. 18212535.1.

English Translation to Foreign OA for CN Patent Appln. No. 201911289495.3 dated Aug. 12, 2023.

Foreign OA for CN Patent Appln. No. 201911289495.3 dated Aug. 12, 2023.

* cited by examiner

EARMOLD WITH CLOSING ELEMENT FOR VENT

RELATED APPLICATION DATA

This application is a continuation of U.S. patent application Ser. No. 16/690,090 filed on Nov. 20, 2019, pending, which claims priority to, and the benefit of, European Patent Application No. 18212555.9 filed on Dec. 14, 2018. The entire disclosures of the above applications are expressly incorporated by reference herein.

FIELD

The present disclosure relates to an earmold for an ear canal of a user. The earmold has an earmold shell. The earmold shell has a first end. The first end faces a tympanic membrane of the user, when the earmold is worn by the user. The earmold shell has a second end. The second end faces toward the surroundings of the user, when the earmold is worn by the user. The earmold comprises a microphone arranged in the second end of the earmold shell, where the microphone is for providing an input signal from the surroundings. The earmold comprises a first processing unit configured for processing the input signal. The earmold comprises a receiver coupled to an output of the processing unit for conversion of an output signal from the processing unit into an audio output signal. The earmold comprises a receiver channel coupled to an output of the receiver and extending to a receiver opening in the first end of the earmold, where the receiver channel is for providing the audio output signal in the ear canal.

BACKGROUND

Earmolds for hearing devices may comprise a vent channel with a vent opening for venting the ear canal of the user wearing the earmold. The vent is for allowing for pressure equalization between the ear canal and the surroundings to reduce or avoid the occlusion effect.

However, there is a need for an improved earmold.

SUMMARY

Disclosed is an earmold for an ear canal of a user. The earmold has an earmold shell. The earmold shell has a first end, the first end is facing a tympanic membrane of an ear canal of the user when the earmold is worn by the user. The earmold shell has a second end, the second end is facing toward the surroundings of the user when the earmold is worn by the user. The earmold comprises a receiver for conversion of an output signal into an audio output signal. The earmold comprises a receiver channel coupled to an output of the receiver and extending to a receiver opening in the first end of the earmold, for providing the audio output signal in the ear canal. The earmold comprises a vent channel coupled to the receiver channel through a first vent port. The vent channel has a vent opening in the second end of the earmold shell. The receiver channel comprises a closing element. The closing element comprises a first magnetic member, wherein the closing element is configured for being in a first state or in a second state, wherein in the first state the closing element causes the first vent port to be open, and in the second state the closing element causes the first vent port to be closed.

According to an aspect, disclosed is an earmold for an ear canal of a user. The earmold has an earmold shell. The earmold shell has a first end. The first end faces a tympanic membrane of an ear canal of the user, when the earmold is worn by the user. The earmold shell has a second end. The second end faces toward the surroundings of the user, when the earmold is worn by the user. The earmold comprises a microphone arranged in the second end of the earmold shell, where the microphone is for providing an input signal from the surroundings. The earmold comprises a first processing unit configured for processing the input signal. The earmold comprises a receiver coupled to an output of the processing unit for conversion of an output signal from the processing unit into an audio output signal. The earmold comprises a receiver channel coupled to an output of the receiver and extending to a receiver opening in the first end of the earmold, where the receiver channel is for providing the audio output signal in the ear canal. The earmold comprises a vent channel coupled to the receiver channel through a first vent port. The vent channel has a vent opening in the second end of the earmold shell. The receiver channel comprises a closing element. The closing element comprises a first magnetic member. The closing element is configured for being in a first state or in a second state. In the first state, the closing element causes the first vent port to be open. In the second state, the closing element causes the first vent port to be closed.

It is an advantage that the closing element can be in two different states providing that the first vent port is either open or closed.

It is an advantage that the earmold is able to open and close the first vent port because when the user speaks, the first vent port can be open thus reducing and/or eliminating the occlusion effect while when the user is silent and listen to an ambient signal e.g. another person speaking, the first vent port can be closed thus enabling a higher sound pressure to be built up in the ear canal.

It is an advantage to have the first vent port open for allowing for pressure equalization between the ear canal and the surroundings to reduce or avoid the occlusion effect.

However, if the user, wearing the hearing device with the earmold, wishes to stream audio in the hearing device, e.g. listening to music, the sound may be bad if the earmold has an open fitting, i.e. if the first port of the earmold is open. Therefore, it is an advantage to have the first vent port closed, when the user is streaming audio in the hearing device, as a closed first port provide good sound for the user.

Thus, it is an advantage that the first magnetic member of the closing element of the earmold can be used for controlling whether the first vent port should be open or closed, and/or for detecting whether the first vent port is open or closed.

Due to the magnetic properties of the first magnetic member of the closing element, it can be detected, by electrical measurement, which state the closing element is in, and thus it can be detected whether the first vent port is open or closed.

This detection can be performed without using battery power of the hearing device.

Furthermore, as the earmold is configured to be arranged in the ear of the user, dirt or earwax may enter the earmold and potentially block the closing element. Thus, it is an advantage that the state of the closing element can be detected, thereby detecting whether the first vent port is open or closed, for checking whether the closing element has been blocked.

The closing element is configured for being in a first state or in a second state. The first state may be a first position. Thus, the closing element may be in a first position in the receiver channel. The second state may be a second position. Thus, the closing element may be in a second position in the receiver channel. In the first state or position, the closing element causes the first vent port to be open. Thus, the closing element ensures that the first vent port is open, or the closing element opens the first vent port. In the second state, the closing element causes the first vent port to be closed. Thus, the closing element ensures that the first vent port is closed, or the closing element closes the first vent port.

The closing element comprising the first magnetic member may be an actuator, such as a magnetic actuator, which can be moved inside the receiver channel by applying a magnetic field to a second magnetic member. The second magnetic member may attract or repel the first magnetic member of the closing element, when a magnetic field is applied, thereby moving the closing element. Moving the closing element provides that the closing element changes or switches between the first state and the second state. Changing the state of the closing element provides that the first vent port changes between being open or closed.

The earmold is for a hearing device.

The hearing device may be a hearing aid configured for compensating for a hearing loss of the user.

The hearing device may be an ear protection device or a hearing protection device.

The hearing device may be a noise protection device.

The hearing device may be for audio streaming of e.g. music, phone calls, etc.

The hearing device may be configured for one or more of hearing loss compensation, noise protections, ear protection, hearing protection, audio streaming etc.

The hearing device may be an in-the-ear (ITE) hearing device, in-the-canal (ITC) hearing device, completely-in-canal (CIC) hearing device, or invisible-in-the-canal (IIC) hearing device.

The hearing device may be a receiver-in-the-ear (RITE) hearing device, receiver-in-the-ear (RIE) hearing aid, or a receiver-in-canal (RIC) hearing device. The hearing device may be a behind-the-ear (BTE) hearing device, e.g. where the receiver is arranged in a housing configured to be positioned behind the ear of a user.

BTE hearing devices may comprise a case, which hangs behind the pinna. The case may be attached to the earmold or to a dome tip by a traditional tube, slim tube, or wire. The tube or wire may extend from the superior-ventral portion of the pinna to the concha, where the earmold or dome tip inserts into the external auditory canal. The case may contain the electronics, controls, battery, and microphone(s). The loudspeaker, or receiver, may be housed in the case, e.g. a traditional BTE, or in the earmold or dome tip, e.g. a receiver-in-the-canal (RIC).

The earmold may have an earmold shell. The earmold shell has an outer surface. The outer surface may be configured to fit into the ear canal of a user of the earmold.

The earmold may extend along an axis. The axis may be parallel to the longitudinal direction of the earmold.

The earmold has a first end, also called tip end (distal end) with a tip surface facing a tympanic membrane of the user when worn by the user. The axis may perpendicular to or substantially perpendicular to the tip surface. The tip surface may be plane or rounded. Further, the earmold has a second end, also called proximal end. The earmold may have a proximal surface facing away from the tympanic membrane when worn by the user.

The earmold comprises a microphone, also denoted ear canal microphone, connected to a first microphone opening for receiving sound in the ear canal. The first microphone acting as an ear canal microphone may be connected to the first microphone opening via a microphone duct formed by a microphone tube and/or a microphone channel in the earmold shell.

The earmold comprises a receiver opening. The earmold may comprise a receiver connected to the receiver opening for producing sound in the ear canal. The receiver may be connected to the receiver opening via a receiver duct formed by a receiver tube and/or a receiver channel in the earmold shell.

The earmold may comprise a vent channel with a vent opening for venting the ear canal.

The vent opening is arranged in the second end of the earmold. The vent channel may extend from the second end of the earmold to the receiver channel and/or to the receiver opening in the first end of the earmold. The vent channel may be connected with the receiver channel. The first vent port may be arranged between the vent channel and the receiver channel.

The first vent port may have a length and/or dimension, along a longitudinal axis of the earmold, of less than 2 mm. The displacement of the closing element may be less than 2 mm.

The earmold may comprise a dome at the first end. The dome may only have one opening being the receiver channel opening.

The processing unit may, in a hearing device, be configured for noise reduction etc. The processing unit may, in a hearing aid, be configured for compensating a hearing loss of the user, for noise reduction etc.

The closing element comprising the first magnetic member may be an actuator, such as a magnetic actuator.

The first magnetic member of the closing element may be a magnetic ring. The first magnetic member may be a permanent magnet.

Thus, the state of the closing element may be changed by applying a magnetic field.

The closing element may be an electroacoustic switch. The electroacoustic switch can be realized by a, e.g. mechanically, bi-stable, or with multiple stable states, system, which contains the closing element comprising the first magnetic member, and which is configured for interacting with a second magnetic member. The closing element comprising the first magnetic member may be a magnetic actuator. The second magnetic member may be a coil. The magnetic field of the second magnetic member, e.g. coil, can either attract the closing element comprising the first magnetic member, e.g. magnetic actuator, or push it away—depending on the orientation of the magnetic field of the second magnetic member (coil).

The closing element comprising the first magnetic member, e.g. magnetic actuator, can, e.g. partially, open and close the receiver channel. The receiver channel may be an acoustic channel.

It may be a problem that the switch state of this closing element cannot be determined other than by switching it into the desired position.

Furthermore, it may be a problem, that if the switching could not be performed due to environmental issues, such as wax, or dirt blocking the movement, this would not be electronically detectable.

Thus, it is an advantage that to be able to detect the state of the closing element (switch) without adding additional sensors, the earmold may comprise a switch state dependent impedance.

An inductive member, e.g. a loop or (electrically closed) coil, may be mechanically attached to the closing element comprising the first magnetic member, e.g. magnetic actuator, in such a way, that the inductive member is positioned closer, such as inside or around the second magnetic member, e.g. driving coil, in one switch state, while being positioned farther away, such as on top of the second magnetic member, for the other state. The inductive coupling between the inductive member, e.g. loop, and the second magnetic member, e.g. driving coil, will change the electrical impedance of the system dependent on the switch state.

Thus, the impedance can be electrically measured and therefore the state of the closing element, e.g. switch, may be determined.

In some embodiments, the earmold further comprises a microphone connected to an opening in the second end via a microphone channel, for providing an input signal from the surroundings, a first processing unit configured for processing the input signal; and wherein the receiver is coupled to an output of the processing unit for conversion of an output signal from the processing unit into the audio output signal.

In some embodiments, the first processing unit is configured to process the input signal according to a hearing loss of a user wearing the earmold and to provide the output signal based on the processed input signal.

In some embodiments, the earmold has a longitudinal axis extending between the first end of the earmold shell and the second end of the earmold shell. In some embodiments, the closing element comprises a passage extending along the longitudinal axis for allowing acoustic waves to propagate through the passage from the output of the receiver to the first end of the earmold shell. The acoustic waves may be the audio output signal, sound, from the receiver.

In some embodiments, the first magnetic member comprises a hollow structure having a first end and a second end opposite the first end, wherein the first magnetic member comprises an opening in each of the first and second ends.

The first magnetic member may be configured to provide the passage in the closing element. The hollow structure of the first magnetic member may comprise the audio passage of the closing element.

The first magnetic member may be configured as a ring or cylinder.

In an embodiment, the closing element is hollow and open in an end facing the tympanic membrane and in an end facing the receiver such that an acoustic signal from the receiver may pass through the closing element when the closing element is in an open state i.e. where the first vent port is open, and when the closing element is in a closed state i.e. where the first vent port is closed.

In an embodiment, the closing element may be a hollow cylinder with a radius r being smaller than a radius R of the receiver channel and a height h smaller than a longitudinal distance H between a first and a second confiner. The hollow cylinder may be positioned such that its longitudinal axis along the height h is along the receiver channel. In an embodiment, the radius r is smaller than the radius R if $0.75*R<r<0.99*R$. In an embodiment, the height h is smaller than the distance H if $0.75*H<h<0.99*H$.

In some embodiments, the earmold comprises a second magnetic member arranged for displacing the closing element by magnetic interaction with the first magnetic member.

The second magnetic member may be a coil, such as a drive coil or driving coil. The second magnetic member may drive the first magnetic member of the closing element.

The second magnetic member may be arranged inside the receiver channel or outside the receiver channel.

The second magnetic member may be arranged between the first vent port and the output of the receiver. Alternatively, the second magnetic member may be arranged between the first vent port and the first end of the earmold.

In some embodiments, the second magnetic member comprises a coil with a number of turns/windings. In some embodiments, the second magnetic member is connected to a current or voltage source.

The current or voltage source may be a DC voltage or current source. When applying the current or voltage to the second magnetic member, the second magnetic member may attract or repel the closing element due to the first magnetic member. For example, a 10 ms burst of DC voltage may change the state, e.g. position, of the closing element.

In an embodiment, the current or voltage source may be a power source of the earmold such as a battery or a rechargeable battery. In an embodiment, the current or voltage source may provide power to the microphone and/or the receiver and/or the first processing unit and the second magnetic member.

In some embodiments, the earmold comprises an inductive member comprising a conductive material, where the inductive member is arranged in a fixed relationship with the closing member and being arranged for inductive coupling with the second magnetic member.

The inductive member may be a closed loop coil.

The inductive member may comprise one or more turns/windings around the longitudinal axis.

The inductive coupling between the inductive member and the second magnetic member may be provided when current or voltage is applied to the second magnetic member.

The inductive member is arranged in a fixed relationship with the closing member. The inductive member may be arranged around the closing member. The inductive member may be arranged around an outside surface of the closing member. The inductive member may be connected to the closing member. The inductive member may be attached directly to the closing member by connection through a rod.

The fixed relationship between the inductive member and the closing element provides that when the closing element moves the inductive member relative to the second magnetic member, the inductive coupling between the second magnetic member and the inductive member changes, and thereby the electrical impedance of the second magnetic member changes accordingly.

It is an advantage that the electrical impedance of the second magnetic member changes, because the electrical impedance can be measured or detected, and thereby a detected change in the electrical impedance indicates that the state of the closing element has changed, i.e. changed from the first state to the second state or vice versa, and thus the first vent port is changed from being open to closed or vice versa. Thus, the measured electrical impedance will provide information of whether the first vent port is open or closed.

In some embodiments, the inductive coupling between the inductive member and the second magnetic member changes the electrical impedance of the second magnetic member dependent on the state of the closing element. Thus, if the closing element is in the first state, the first vent port is open, and the electrical impedance will have one value, such as a first value. If the closing element is in the second state, the first vent port is closed, and the electrical impedance will have another value, such as a second value. The first value may be higher or lower than the second value.

For example, the electrical impedance may be higher if the inductive member is closer to the second magnetic member. This may for example be the case, when the first vent port is open.

In another example, the electrical impedance may be lower if the inductive member is closer to the second magnetic member. This may for example be the case, when the first vent port is open.

In yet another example, the electrical impedance may be higher if the inductive member is further from the second magnetic member. This may for example be the case, when the first vent port is closed.

In yet another example, the electrical impedance may be lower if the inductive member is further from the second magnetic member. This may for example be the case, when the first vent port is closed.

In some embodiments, a second processing unit is configured for determining the state of the closing element based on the electrical impedance of the second magnetic member.

It is an advantage that the second processing unit can determine the state of the closing element based in the electrical impedance, as this may save battery, since an additional sensor may not be required for determining the state of the closing element.

The second processing unit may be the same as the first processing unit or a different processing unit.

In some embodiments, the second processing unit is configured to detect that the closing element changes from the first state to the second state by detecting a decrease in the electrical impedance of the second magnetic member.

In some embodiments, the second processing unit is configured to detect that the closing element changes from the second state to the first state by detecting an increase in the electrical impedance of the second magnetic member.

In some embodiments, the second processing unit is configured for setting the state of the closing element by adjusting a current or voltage supplied to the second magnetic member.

It is an advantage that the second processing unit can set the state of the closing element by applying a suitable current or voltage to the second magnetic member, thereby changing the electrical impedance.

In some embodiments, the second processing unit is configured for error detection by comparing the set state with the determined state of the closing element.

The set state of the closing element may be set e.g. in a user interface, by the user of the hearing device in which the earmold is arranged. If the user wishes to stream audio in the hearing device, the user may set the hearing device in a streaming mode, and the first vent port of the earmold should be closed, when the hearing device is in streaming mode. Thus, the closing element should be in the second, closed, state.

If instead, the user sets the hearing device in e.g. a normal mode or hear-through mode, the first vent port of the earmold should be open. Thus, the closing element should be in the first, open, state.

It is thus an advantage that the second processing unit may determine the actual state of the closing element based on the measured electrical impedance of the second magnetic member. If the second processing unit determines that the closing element is in the first state, but the closing element is set in the second state or vice versa, this is an error that can be detected.

The actual state of the closing element and the set state of the closing element may be different or opposite, for example if the displacement or movement of the closing element is blocked. Dirt or earwax can block the movement of the closing element.

In some embodiment, the earmold further comprises a second microphone connected to an opening in the first end of the earmold via a second microphone channel for providing a second input signal from the ear canal.

In some embodiments, the second processing unit is configured for setting the state of the closing element based on detection of an own voice signal of the user.

In some embodiments, the second processing unit is configured to detect the own voice signal of the user based on the input signal and the second input signal.

In some embodiments, the second processing unit is configured for detecting a mode of operation of the earmold or hearing device. In some embodiments, the second processing unit is configured for setting the state of the closing element according to the mode of operation.

Thus, the second processing unit may detect a mode of operation of the earmold or hearing device, and the second processing unit may set the mode of the operation via the closing element. The user of the hearing device may determine which mode of operation the hearing device, and thus the earmold, should be in. For example, the user can use a user interface, e.g. using an app on a connected smart phone, and/or using mechanical push buttons on the hearing device itself. The hearing device may determine which mode of operation is suitable, e.g. based on acoustic detection, based on the presence of the audio from a connected smart phone etc.

The mode can be a streaming mode with the first vent port closed. The mode can be a listening mode with the first vent port open. Other modes may be possible.

In some embodiments, the second processing unit is configured for receiving a user input setting the mode of operation and/or setting the state of the closing element.

The user input may be received via a user interface.

In some embodiments, the earmold comprises a confiner configured for confining the displacement of the closing element in the receiver channel.

The confiner may comprise stopping elements and/or constrictions in the receiver channel.

According to an aspect, disclosed is a hearing device comprising the earmold according to the above.

In some embodiments, the hearing device is selected from the group consisting of a hearing aid, a hearing protection device and a headset.

The present disclosure relates to different aspects including the earmold, hearing device, hearing aid, hearing protection device, and system described above and in the following, and corresponding earmolds, hearing devices, hearing aids, hearing protection devices, methods, system parts, and systems, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
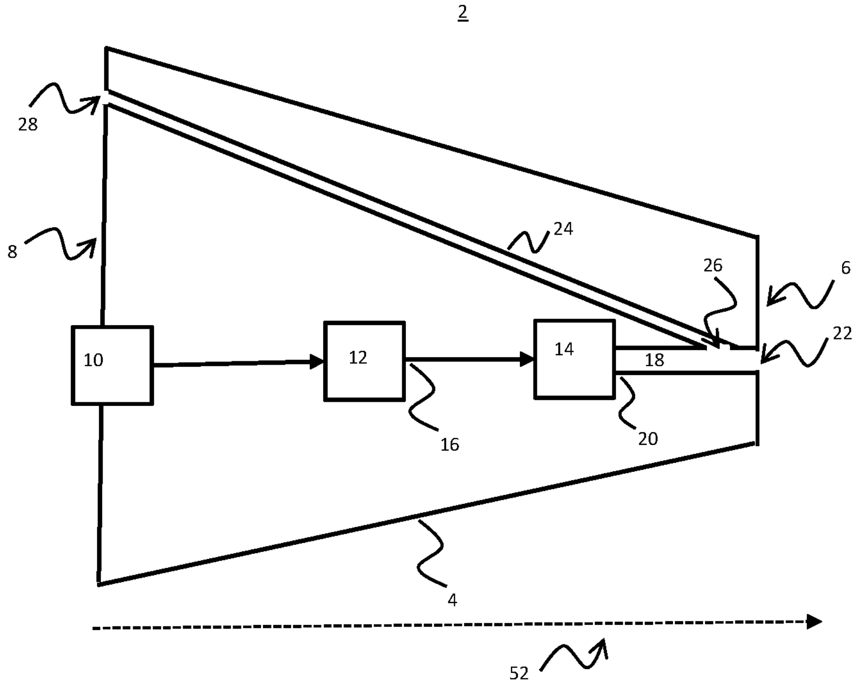
FIG. 1 schematically illustrates an example of an earmold for an ear canal of a user.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates an example of an earmold for an ear canal of a user. The earmold 2 has an earmold shell 4. The earmold shell 4 has a first end 6. The first end 6 faces a tympanic membrane of the user, when the earmold 2 is worn by the user. The earmold shell 6 has a second end 8. The second end 8 faces toward the surroundings of the user, when the earmold 2 is worn by the user. The earmold 2 comprises a microphone 10 arranged in the second end 8 of the earmold shell 4, where the microphone 10 is for providing an input signal from the surroundings. The earmold 2 comprises a first processing unit 12 configured for processing the input signal. The earmold 2 comprises a receiver 14 coupled to an output 16 of the processing unit 12 for conversion of an output signal from the first processing unit 12 into an audio output signal. The earmold 2 comprises a receiver channel 18 coupled to an output 20 of the receiver 14 and extending to a receiver opening 22 in the first end 6 of the earmold 2, where the receiver channel 18 is for providing the audio output signal in the ear canal. The earmold 2 comprises a vent channel 24 coupled to the receiver channel 18 through a first vent port 26. The vent channel 24 has a vent opening 28 in the second end 8 of the earmold shell 4.

Figure 2A:
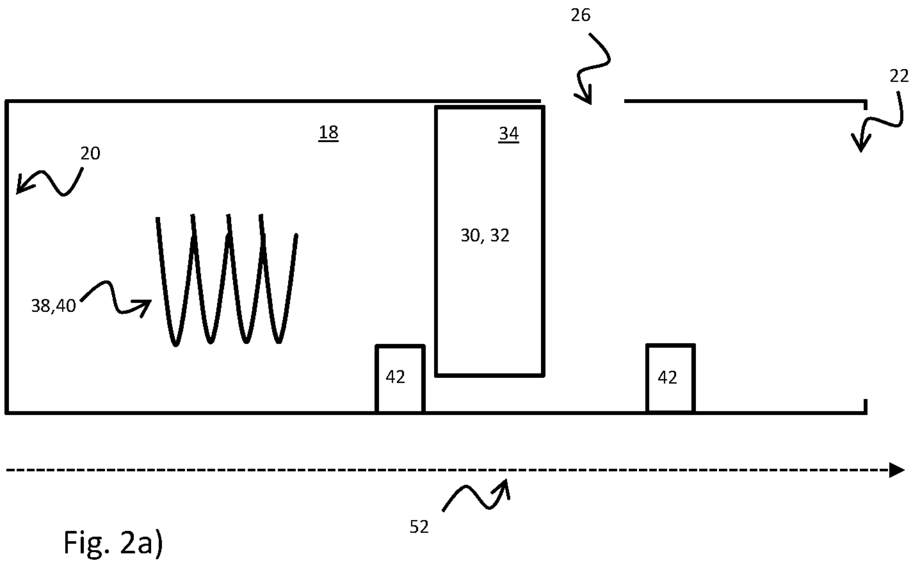
FIGS. 2*a*) and 2*b*) schematically illustrate an example of an earmold receiver channel with a closing element, and second magnetic member.

FIGS. 2*a*) and 2*b*) schematically illustrates an example of a receiver channel 18. The receiver channel 18 comprises a closing element 30. The closing element 30 comprises a first magnetic member 32. The closing element 30 is configured for being in a first state 34 or in a second state 36. In the first state 34, the closing element 30 causes the first vent port 26 to be open. In the second state 36, the closing element 30 causes the first vent port 26 to be closed.

In an embodiment, the closing element 30 is hollow and open in an end facing the tympanic membrane and in an end facing the receiver such that an acoustic signal from the receiver may pass through the closing element when the closing element is in an open state i.e. where the first vent port 26 is open, and when the closing element is in a closed state i.e. where the first vent port 26 is closed.

In an embodiment, the closing element 30 may be a hollow cylinder with a radius r being smaller than a radius R of the receiver channel and a height h smaller than a longitudinal distance H between a first and a second confiner 42. The hollow cylinder may be positioned such that its longitudinal axis 52 along the height h is along the receiver channel 18. In an embodiment, the radius r is smaller than the radius R if $0.75*R<r<0.99*R$. In an embodiment, the height h is smaller than the distance H if $0.75*H<h<0.99*H$.

The earmold comprises a second magnetic member 38 arranged for displacing the closing element 30 by magnetic interaction with the first magnetic member 32 of the closing element 30.

Figure 2B:
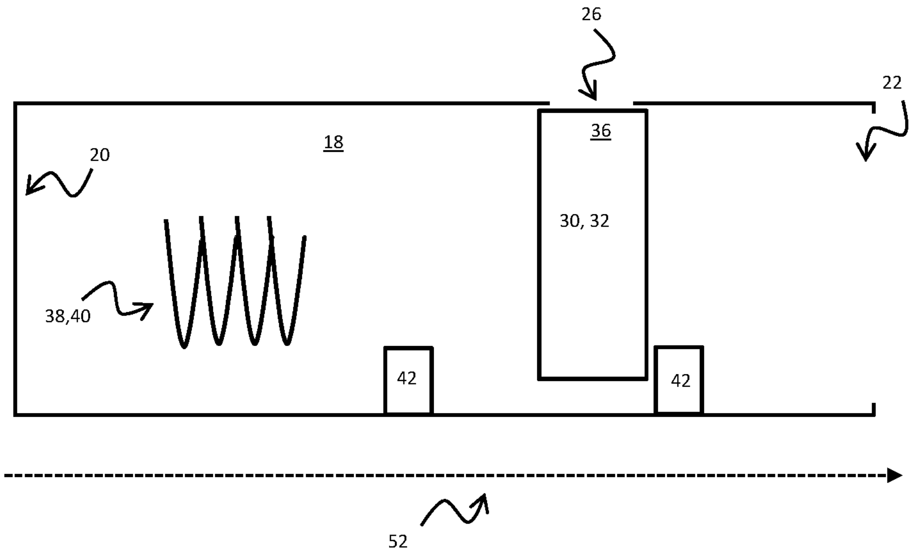

The second magnetic member 38 is configured to attract or repel the first magnetic member 32 of the closing element 30, when a magnetic field is applied, thereby moving the closing element 30. Moving the closing element 30 provides that the closing element 30 changes or switches between the first state 34 and the second state 36. Changing the state of the closing element 30 provides that the first vent port 26 changes between being open, FIG. 2*a*), or closed, FIG. 2*b*).

The second magnetic member 38 may be a coil, such as a drive coil or driving coil. The second magnetic member 38 may drive the first magnetic member 32 of the closing element 30. The second magnetic member 38 is arranged inside the receiver channel 18. Alternatively, second magnetic member 38 can be arranged outside the receiver channel 18.

The second magnetic member 18 is arranged between the first vent port 26 and the output 20 of the receiver 14. Alternatively, the second magnetic member 38 may be arranged between the first vent port 26 and the receiver opening 22.

The second magnetic member 38 comprises a coil 40 with a number of turns.

The second magnetic member 38 may be connected to a current or voltage source. The current or voltage source may be a DC voltage or current source. When applying the current or voltage to the second magnetic member 38, the second magnetic member 38 may attract or repel the closing element 30 due to the first magnetic member 32. For example, a 10 ms burst of DC voltage may change the state 34, 36, e.g. position, of the closing element 30. In an embodiment, the current or voltage source may be a power source of the earmold such as a battery or a rechargeable battery. In an embodiment, the current or voltage source may provide power to the microphone and/or the receiver and/or the first processing unit and the second magnetic member 38.

The earmold comprises confiners 42 configured for confining the displacement of the closing element 30 in the receiver channel 18. The confiners 42 may comprise stopping elements and/or constrictions in the receiver channel 18.

Figure 3A:
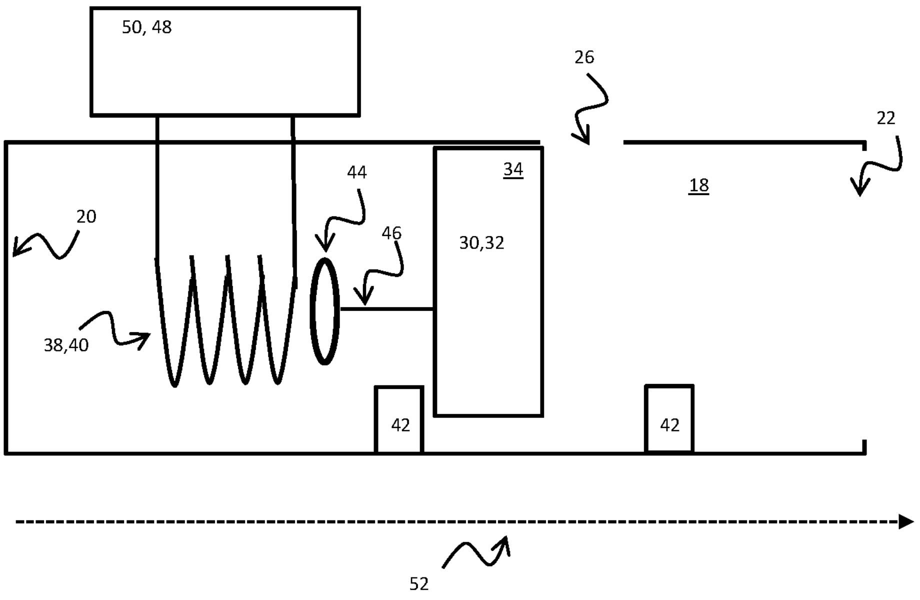
FIGS. 3*a*) and 3*b*) schematically illustrate an example of an earmold receiver channel with a closing element, second magnetic member and inductive member.

FIGS. 3*a*) and 3*b*) schematically illustrates an embodiment of a receiver channel 18. The receiver channel 18 comprises a closing element 30. The closing element 30 comprises a first magnetic member 32. The closing element 30 is configured for being in a first state 34 or in a second state 36. In the first state 34, the closing element 30 causes the first vent port 26 to be open. In the second state 36, the closing element 30 causes the first vent port 26 to be closed.

In an embodiment, the closing element 30 is hollow and open in an end facing the tympanic membrane and in an end facing the receiver such that an acoustic signal from the receiver may pass through the closing element when the closing element is in an open state i.e. where the first vent port 26 is open, and when the closing element is in a closed state i.e. where the first vent port 26 is closed.

In an embodiment, the closing element 30 may be a hollow cylinder with a radius r being smaller than a radius R of the receiver channel and a height h smaller than a longitudinal distance H between a first and a second confiner 42. The hollow cylinder may be positioned such that its longitudinal axis 52 along the height h is along the receiver channel 18. In an embodiment, the radius r is smaller than the radius R if $0.75*R<r<0.99*R$. In an embodiment, the height h is smaller than the distance H if $0.75*H<h<0.99*H$.

The earmold comprises a second magnetic member 38 arranged for displacing the closing element 30 by magnetic interaction with the first magnetic member 32 of the closing element 30.

Figure 3B:
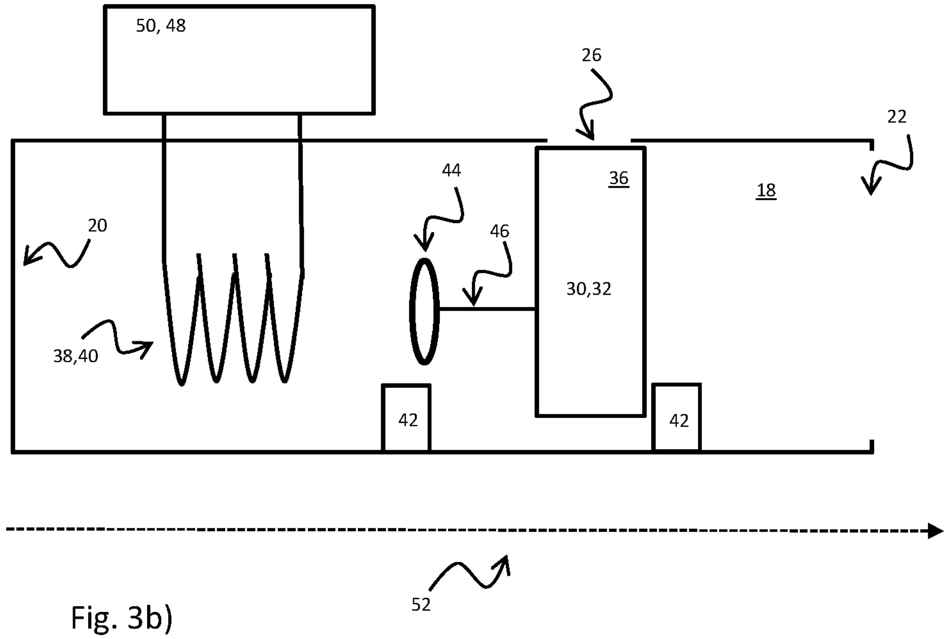

The second magnetic member 38 is configured to attract or repel the first magnetic member 32 of the closing element 30, when a magnetic field is applied, thereby moving the closing element 30. Moving the closing element 30 provides that the closing element 30 changes or switches between the first state 34 and the second state 36. Changing the state of the closing element 30 provides that the first vent port 26 changes between being open, FIG. 3*a*), or closed, FIG. 3*b*).

The second magnetic member 38 may be a coil, such as a drive coil or driving coil. The second magnetic member 38 may drive the first magnetic member 32 of the closing element 30. The second magnetic member 38 is arranged inside the receiver channel 18. Alternatively, second magnetic member 38 can be arranged outside the receiver channel 18.

The second magnetic member 18 is arranged between the first vent port 26 and the output 20 of the receiver 14. Alternatively, the second magnetic member 38 may be arranged between the first vent port 26 and the receiver opening 22.

The second magnetic member 38 comprises a coil 40 with a number of turns.

The second magnetic member 38 is connected to a current/voltage source 50. The current or voltage source 50 may be a DC voltage or current source. When applying the current or voltage to the second magnetic member 38, the second magnetic member 38 may attract or repel the closing element 30 due to the first magnetic member 32. For example, a 10 ms burst of DC voltage may change the state 34, 36, e.g. position, of the closing element 30. In an embodiment, the current or voltage source 50 may be a power source of the earmold such as a battery or a rechargeable battery. In an embodiment, the current or voltage source may provide power to the second magnetic member 38 and the microphone and/or the receiver and/or the first processing unit.

The earmold comprises confiners 42 configured for confining the displacement of the closing element 30 in the receiver channel 18. The confiners 42 may comprise stopping elements and/or constrictions in the receiver channel 18.

The earmold comprises an inductive member 44 comprising a conductive material, where the inductive member 44 is arranged in a fixed relationship with the closing member 30 and is arranged for inductive coupling with the second magnetic member 38.

The inductive member 44 is a closed loop coil. The inductive member may comprise one or more turns around the longitudinal axis 52.

The inductive coupling between the inductive member 44 and the second magnetic member 38 may be provided when current or voltage is applied to the second magnetic member 38 through the current/voltage source 50.

The inductive member 44 is connected to the closing member 30. The inductive member 44 is attached directly to the closing member 30 by connection through a rod 46. Alternatively, the inductive member 44 may be arranged around the closing member 30, such as arranged around an outside surface of the closing member 30.

The fixed relationship between the inductive member 44 and the closing element 30 provides that when the closing element 30 moves the inductive member 44 relative to the second magnetic member 38, the inductive coupling between the second magnetic member 38 and the inductive member 44 changes, and thereby the electrical impedance of the second magnetic member 38 changes accordingly.

This change in electrical impedance can be detected or determined by a second processing unit 48 connected to the second magnetic member 38.

The second processing unit 48 is configured for determining the state of the closing element 30 based on the electrical impedance of the second magnetic member 38.

The second processing unit 48 may be the same as the first processing unit 12 or may be a different processing unit.

The second processing unit 48 is configured for setting the state 34, 36 of the closing element 30 by adjusting a current or voltage supplied from the current/voltage source 42 to the second magnetic member 38.

The second processing unit 48 is configured to detect that the closing element 30 changes from the first state 34, i.e. first vent port 26 open, to the second state 36, i.e. first vent port 26 closed, by detecting a decrease in the electrical impedance of the second magnetic member 38.

The second processing unit 48 is configured to detect that the closing element 30 changes from the second state 36, i.e. first vent port 26 closed, to the first state 34, i.e. first vent port 26 open, by detecting an increase in the electrical impedance of the second magnetic member 38.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

2 earmold
4 earmold shell
6 first end
8 second end
10 microphone
12 first processing unit
14 receiver
16 output of the first processing unit
18 receiver channel
20 output of the receiver
22 receiver opening
24 vent channel
26 first vent port
28 vent opening 28
30 closing element
32 first magnetic member
34 first state of closing element
36 second state of closing element
38 second magnetic member
40 coil of second magnetic member
42 confiners
44 inductive member
46 rod connecting inductive member and closing element

48 second processing unit
50 current/voltage source
52 longitudinal axis

The invention claimed is:

1. An earmold having an earmold shell, the earmold shell having a first end and a second end, wherein when the earmold is worn by a user, a tympanic membrane of the user is closer to the first end than the second end, the earmold comprising:

a receiver configured to provide an audio output signal;

a receiver channel coupled to an output of the receiver and extending to a receiver opening;

a vent channel coupled to the receiver channel through a vent port, the vent channel having a vent opening; and a closing element, the closing element comprising a first magnetic member, wherein the first magnetic member is configured to move relative to the vent port, and wherein the closing element is configured to cause the vent port to be open when the closing element is in a first state, and to cause the vent port to be closed when the closing element is in a second state.

2. The earmold according to claim 1, further comprising:

a microphone configured to provide an input signal; and a first processing unit configured to provide an output signal based on the input signal; and wherein the receiver is configured to provide the audio output signal based on the output signal.

3. The earmold according to claim 2, wherein the first processing unit is configured to process the input signal according to a hearing loss of the user.

4. The earmold according to claim 1, wherein the earmold has a longitudinal axis extending between the first end of the earmold shell and the second end of the earmold shell, and wherein the receiver channel extends along the longitudinal axis.

5. The earmold according to claim 1, wherein the first magnetic member comprises a hollow structure.

6. The earmold according to claim 1, further comprising a second magnetic member configured to displace the closing element by magnetic interaction with the first magnetic member.

7. The earmold according to claim 6, wherein the second magnetic member comprises a coil with a plurality of turns, and wherein the second magnetic member is connected to a current or voltage source.

8. The earmold according to claim 6, further comprising an inductive member for inductive coupling with the second magnetic member.

9. The earmold according to claim 8, wherein the inductive member comprises one or more turns around a longitudinal axis of the earmold.

10. The earmold according to claim 8, wherein the second magnetic member comprises an electrical impedance.

11. The earmold according to claim 10, wherein the electrical impedance of the second magnetic member is based on the inductive coupling.

12. The earmold according to claim 1, wherein the receiver comprises a speaker, and wherein the receiver channel extends from the speaker to the receiver opening.

13. The earmold according to claim 1, wherein the receiver channel and the vent channel are separated by a structure that is stationary with respect to both the receiver channel and the vent channel.

14. The earmold according to claim 1, wherein the first magnetic member is configured to move inside the earmold relative to the receiver channel.

15. The earmold according to claim 1, further comprising:

a second magnetic member configured to displace the closing element; and a processing unit configured to determine a state of the closing element based on an electrical impedance of the second magnetic member, wherein the determined state is the first state or the second state.

16. An earmold having an earmold shell, the earmold shell having a first end and a second end, wherein when the earmold is worn by a user, a tympanic membrane of the user is closer to the first end than the second end, the earmold comprising:

a receiver configured to provide an audio output signal;

a receiver channel coupled to an output of the receiver and extending to a receiver opening; and a vent channel coupled to the receiver channel through a vent port, the vent channel having a vent opening;

a closing element configured to cause the vent port to be open when the closing element is in a first state, and to cause the vent port to be closed when the closing element is in a second state;

a magnetic member configured to displace the closing element, wherein the second magnetic member comprises an electrical impedance;

a processing unit configured to determine a state of the closing element based on the electrical impedance of the magnetic member.

17. The earmold according to claim 16, wherein the processing unit is configured to detect that the closing element changes from the first state to the second state by detecting a decrease in the electrical impedance of the magnetic member.

18. The earmold according to claim 16, wherein the processing unit is configured to detect that the closing element changes from the second state to the first state by detecting an increase in the electrical impedance of the magnetic member.

19. The earmold according to claim 16, wherein the processing unit is configured to set a desired state of the closing element by adjusting a current or voltage supplied to the magnetic member.

20. The earmold according to claim 19, wherein the processing unit is configured for error detection by comparing the set desired state with the determined state of the closing element.

21. An earmold having an earmold shell, the earmold shell having a first end and a second end, wherein when the earmold is worn by a user, a tympanic membrane of the user is closer to the first end than the second end, the earmold comprising:

a receiver configured to provide an audio output signal;

a receiver channel coupled to an output of the receiver and extending to a receiver opening; and a vent channel coupled to the receiver channel through a vent port, the vent channel having a vent opening;

a closing element configured to cause the vent port to be open when the closing element is in a first state, and to cause the vent port to be closed when the closing element is in a second state;

a magnetic member configured to displace the closing element; and an inductive member for inductive coupling with the magnetic member.

* * * * *